(12) United States Patent
Garrison et al.

(10) Patent No.: US 10,680,902 B2
(45) Date of Patent: Jun. 9, 2020

(54) VIRTUAL AGENTS FOR FACILITATION OF NETWORK BASED STORAGE REPORTING

(71) Applicant: AT&T Intellectual Property I, L.P., Atlanta, GA (US)

(72) Inventors: Joseph Garrison, Villa Rica, GA (US); Kim Haislip, Stone Mountain, GA (US); Frank Webb, Snohomish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 76 days.

(21) Appl. No.: 15/253,028

(22) Filed: Aug. 31, 2016

(65) Prior Publication Data
US 2018/0062938 A1    Mar. 1, 2018

(51) Int. Cl.
*H04L 12/24*    (2006.01)
*H04L 12/26*    (2006.01)
*H04L 29/08*    (2006.01)

(52) U.S. Cl.
CPC .......... *H04L 41/147* (2013.01); *H04L 41/046* (2013.01); *H04L 43/14* (2013.01); *H04L 43/0876* (2013.01); *H04L 67/1097* (2013.01)

(58) Field of Classification Search
CPC ............. H04L 67/1097; H04L 12/4641; H04L 41/0806; H04L 63/027; G06F 15/16; G06F 3/067
USPC ................................ 709/202, 220; 370/223
See application file for complete search history.

(56) References Cited

U.S. PATENT DOCUMENTS

| 7,403,987 | B1 | 7/2008 | Marinelli et al. |
| 7,552,437 | B2 | 6/2009 | Di Luoffo et al. |
| 7,623,446 | B1 * | 11/2009 | Allan ........................ H04L 1/22 370/223 |
| 7,774,444 | B1 | 8/2010 | George et al. |
| 8,019,849 | B1 | 9/2011 | Lopilato et al. |
| 8,175,863 | B1 | 5/2012 | Ostermeyer et al. |

(Continued)

FOREIGN PATENT DOCUMENTS

| CA | 2879047 A1 | 1/2014 |
| GB | 2528584 A | 1/2016 |

OTHER PUBLICATIONS

"Storage Manager has been replaced by Storage Resource Monitor," www.solarwinds.com, Jun. 17, 2012, SolarWinds Worldwide, LLC., 1 page. http://web.archive.org/web/20120617022055/http://www.solarwinds.com/storagemanager.aspx.

(Continued)

*Primary Examiner* — Tesfay Yohannes
(74) *Attorney, Agent, or Firm* — Amin, Turocy & Watson, LLP

(57) ABSTRACT

Techniques for virtual agent facilitation of network-based storage reporting are provided. A method can comprise determining, by a virtual agent comprising a processor and located at a node, first information indicative of data storage associated with the node, wherein the virtual agent is configured to be instantiated at the node in response to an instantiation instruction, and comprises non-proprietary, publicly available open source software. The method can also comprise outputting, by the virtual agent, the first information for reporting and forecasting of future capacity growth on the node or a network device of a network to which the node is communicatively coupled.

20 Claims, 13 Drawing Sheets

(56) References Cited

U.S. PATENT DOCUMENTS

| | | | |
|---|---|---|---|
| 8,578,000 B2* | 11/2013 | Van Wie | H04L 12/00 709/220 |
| 8,762,680 B2* | 6/2014 | Arndt | G06F 9/5077 711/173 |
| 8,799,431 B2 | 8/2014 | Pabari | |
| 8,825,862 B2 | 9/2014 | Anderson et al. | |
| 8,856,332 B2 | 10/2014 | Johnson et al. | |
| 8,856,483 B1 | 10/2014 | Paterson-Jones et al. | |
| 9,153,049 B2 | 10/2015 | Bogdany et al. | |
| 9,298,715 B2 | 3/2016 | Kumarasamy et al. | |
| 9,311,121 B2 | 4/2016 | Deshpande et al. | |
| 9,313,281 B1 | 4/2016 | Lietz et al. | |
| 2004/0117408 A1* | 6/2004 | Bharadwaj | G06F 16/20 |
| 2005/0044301 A1 | 2/2005 | Vasilevsky et al. | |
| 2010/0306249 A1* | 12/2010 | Hill | G06Q 30/02 707/769 |
| 2012/0317249 A1 | 12/2012 | Salsburg et al. | |
| 2014/0040182 A1 | 2/2014 | Gilder et al. | |
| 2014/0196038 A1 | 7/2014 | Kottomtharayil et al. | |
| 2014/0337500 A1 | 11/2014 | Lee | |
| 2015/0033226 A1* | 1/2015 | Phelan | G06F 9/45545 718/1 |
| 2015/0074060 A1 | 3/2015 | Varadharajan et al. | |
| 2015/0154055 A1* | 6/2015 | Branson | G06F 9/5011 718/104 |
| 2015/0222515 A1* | 8/2015 | Mimura | H04L 43/0876 709/224 |
| 2015/0222723 A1 | 8/2015 | Adapalli et al. | |
| 2015/0288571 A1 | 10/2015 | Baughman et al. | |
| 2016/0036718 A1 | 2/2016 | Shingari et al. | |
| 2016/0065417 A1 | 3/2016 | Sapuram et al. | |
| 2016/0128083 A1 | 5/2016 | Shakya et al. | |
| 2016/0156513 A1* | 6/2016 | Zhang | H04L 41/00 709/220 |
| 2016/0294614 A1* | 10/2016 | Searle | G06F 8/654 |
| 2016/0366041 A1* | 12/2016 | Seenappa | H04L 43/12 |
| 2017/0123943 A1* | 5/2017 | Nagalingam | G06F 11/2033 |
| 2017/0339147 A1* | 11/2017 | Wen | H04L 63/0892 |

OTHER PUBLICATIONS

"The Truth About Agent Vs. Agentless Monitoring," www.idera.com, Oct. 1, 2015, IDERA, 7 pages. https://www.idera.com/resourcecentral/whitepapers/servermonitoringsoftwarethetruthaboutagentvsagentlessmonitoring.

"Qualys Cloud Platform: A Continuous View of Your Security & Compliance," www.qualys.com, Sep. 21, 2012, Qualys, Inc., 6 pages. http://web.archive.org/web/20120921012347/http://www.qualys.com/enterprises/securitycompliancecloudplatform/.

"Manage Capacity with the Capacity Management Solution," technet.microsoft.com, Sep. 10, 2015, Microsoft, 5 pages. https://technet.microsoft.com/enus/library/mt484086.aspx.

Chamness, "Capacity Forecasting in a Backup Storage Environment," Proceedings of USENIX Large Installation System Administration Conference (LISA), 2011, vol. 4, 9 pages. https://www.usenix.org/legacy/event/lisa11/tech/full_papers/Chamness.pdf.

"Storage Capacity Forecasting and Planning," manageengine.com, Sep. 14, 2015, 4 pages. http://web.archive.org/web/20150914174534/https://www.manageengine.com/products/opstor/storagecapacityforecastingplanning.html.

"Process Monitoring," OSSEC 2.8.1 documentation, Manual, Log Monitoring and Analysis. Last Accessed: May 10, 2016, 3 pages. http://ossecdocs.readthedocs.io/en/latest/manual/monitoring/processmonitoring.html.

* cited by examiner xxxxxxx
Linux 2.4.32-573.18.1.e16.x86_44   XXXXXXXXXXXXXXXXXXXXXXXXXXXXXXXXX

| | CPU | \user | xxxx | \system | xxxx | xxxx | \idle |
|---|---|---|---|---|---|---|---|
| 12:00:01 AM | all | 0.16 | 0.00 | 0.08 | 0.00 | 0.00 | 99.76 |
| 12:10:01 AM | all | 0.14 | 0.00 | 0.18 | 0.00 | 0.00 | 99.67 |
| 12:20:01 AM | all | 0.14 | 0.00 | 0.10 | 0.00 | 0.00 | 99.75 |
| 12:30:01 AM | all | 0.04 | 0.00 | 0.04 | 0.00 | 0.00 | 99.92 |
| 12:40:01 AM | all | 0.11 | 0.00 | 0.13 | 0.00 | 0.00 | 99.76 |
| 12:50:01 AM | all | 0.17 | 0.00 | 0.10 | 0.00 | 0.00 | 99.73 |
| 01:00:01 AM | all | 0.11 | 0.00 | 0.09 | 0.00 | 0.00 | 99.80 |
| 01:10:01 AM | all | 0.12 | 0.00 | 0.21 | 0.00 | 0.00 | 99.66 |
| 01:20:01 AM | all | 0.05 | 0.00 | 0.08 | 0.00 | 0.00 | 99.87 |
| 01:30:01 AM | all | 0.05 | 0.00 | 0.05 | 0.00 | 0.00 | 99.89 |
| 01:40:01 AM | all | 0.22 | 0.00 | 0.21 | 0.00 | 0.00 | 99.57 |
| 01:50:01 AM | all | 0.10 | 0.00 | 0.08 | 0.00 | 0.00 | 99.81 |
| 02:00:01 AM | all | 0.19 | 0.00 | 0.13 | 0.00 | 0.00 | 99.67 |
| 02:10:01 AM | all | 0.15 | 0.00 | 0.22 | 0.00 | 0.00 | 99.63 |
| 02:20:01 AM | all | 0.09 | 0.00 | 0.09 | 0.00 | 0.00 | 99.82 |
| 02:30:01 AM | all | 0.05 | 0.00 | 0.04 | 0.00 | 0.00 | 99.88 |
| 02:40:01 AM | all | 0.07 | 0.00 | 0.10 | 0.00 | 0.00 | 99.84 |
| 02:50:01 AM | all | 0.12 | 0.00 | 0.20 | 0.00 | 0.00 | 99.68 |
| 03:00:01 AM | all | | | | | | |

FIG. 4A

XXXXX
Linux XXXXXXXXXXXXXXXXXXXXXXXXX

| | XXXX | XXXX | XXXX | XXXX | XXXX | XXXX | XXXX |
|---|---|---|---|---|---|---|---|
| 12:00:01 AM | Number | Number | 14.XX | Number | Number | Number | 0.XX |
| 12:10:01 AM | Number | Number | 14.0X | Number | Number | Number | 0.XX |
| 12:20:01 AM | Number | Number | 14.0X | Number | Number | Number | 0.XX |
| 12:30:01 AM | Number | Number | 14.0X | Number | Number | Number | 0.XX |
| 12:40:01 AM | Number | Number | 14.0X | Number | Number | Number | 0.XX |
| 12:50:01 AM | Number | Number | 14.0X | Number | Number | Number | 0.XX |
| 01:00:01 AM | Number | Number | 14.0X | Number | Number | Number | 0.XX |
| 01:10:01 AM | Number | Number | 14.0X | Number | Number | Number | 0.XX |
| 01:20:01 AM | Number | Number | 14.0X | Number | Number | Number | 0.XX |
| 01:30:01 AM | Number | Number | 14.0X | Number | Number | Number | 0.XX |
| 01:40:01 AM | Number | Number | 14.0X | Number | Number | Number | 0.XX |
| 01:50:01 AM | Number | Number | 14.0X | Number | Number | Number | 0.XX |
| 02:00:01 AM | Number | Number | 14.0X | Number | Number | Number | 0.XX |
| 02:10:01 AM | Number | Number | 14.0X | Number | Number | Number | 0.XX |
| 02:20:01 AM | Number | Number | 14.0X | Number | Number | Number | 0.XX |
| 02:30:01 AM | Number | Number | 14.0X | Number | Number | Number | 0.XX |
| 02:40:01 AM | Number | Number | 14.0X | Number | Number | Number | 0.XX |
| 02:50:01 AM | Number | Number | 14.0X | Number | Number | Number | 0.XX |
| 03:00:01 AM | Number | Number | 14.0X | Number | Number | Number | 0.XX |
| 03:10:01 AM | Number | Number | 14.0X | Number | Number | Number | 0.XX |
| 03:20:01 AM | Number | Number | 14.XX | Number | Number | Number | 0.XX |
| 03:30:01 AM | Number | Number | 14.XX | Number | Number | Number | 0.XX |
| 03:40:01 AM | Number | Number | 14.14 | Number | Number | Number | 0.XX |

FIG. 4B

```
$ snapwalk - v 1 -c V\Irtucon          :1691 system

Timeout: No Response from $ snapwalk - v 1 -c V\Irtucon          system

SNMPv2-MIB::sysDesc.0 = STRING: SystemEDGE 5.8 for MP5 Operations

SNMPv2-MIB::sysObjectID.0 = OID: SNMPv2-SMI::enterprises.546

DISMAN-EVENT-MIB::sysUpTimeInstance = Timeticks: (65345827) 7 days, 13:30:58.27

SNMPv2-MIB::sysContact.0 = STRING: MP5 Operations

SNMPv2-MIB::sysName.0 = STRING: n1

SNMPv2-MIB::sysLocation.0 = STRING:

SNMPv2-MIB::sysServices.) = INTEGER: 12
```

VIRTUAL AGENTS FOR FACILITATION OF NETWORK BASED STORAGE REPORTING

TECHNICAL FIELD

The subject disclosure relates generally to virtual agents and to facilitating network based storage reporting employing virtual agents.

BACKGROUND

Traditionally, no comprehensive method has existed to gather data to be used for reporting and/or for forecasting future capacity growth on various network applications and physical or virtual service nodes. Further, there are no adequate internal or vendor tools to sufficiently address the needs to retrieve valuable storage data on a per-platform basis. Accordingly, opportunities exist to provide network based storage reporting on a per platform basis.

BRIEF DESCRIPTION OF THE DRAWINGS

FIGS. 4A, 4B and 4C illustrate screenshots of data collection, processing and reporting in accordance with one or more embodiments described herein.

DETAILED DESCRIPTION

Figure 1:
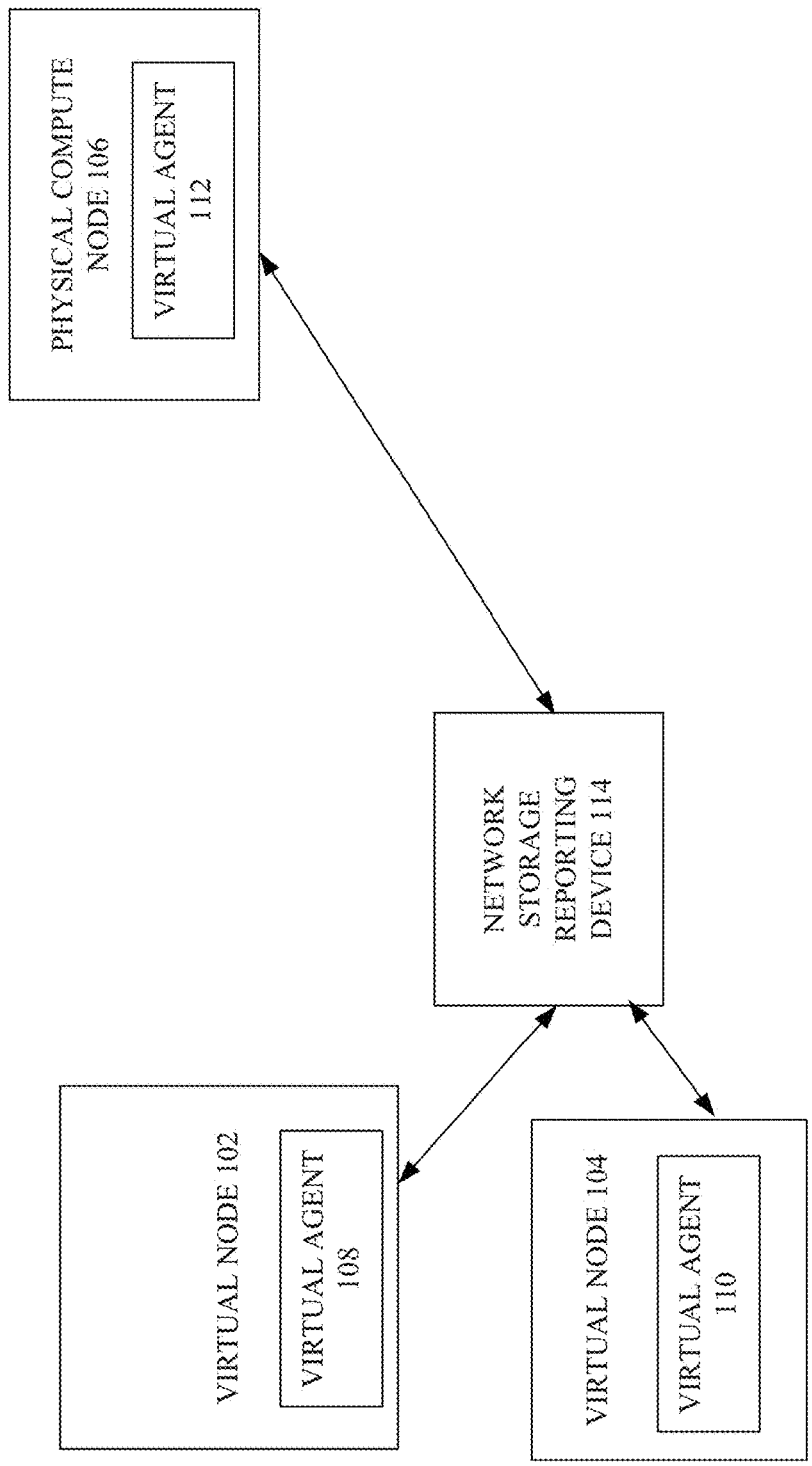
FIG. 1 illustrates an example block diagram of a system including a virtual agent to facilitate network based storage reporting in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Embodiments described herein comprise systems, methods, apparatus and/or computer-readable storage media that facilitate network based storage reporting. In one example embodiment, a method can comprise determining, by a virtual agent cooperating with a processor and located at a node, first information indicative of data storage associated with the node, wherein the virtual agent is configured to be instantiated at the node in response to an instantiation instruction, and wherein the virtual agent comprises publicly available open source software. The method can also comprise outputting, by the virtual agent, the first information for reporting and forecasting of future capacity growth on the node or a network device of a network to which the node is communicatively coupled.

In another example embodiment, a machine-readable storage medium is provided. The machine-readable storage medium can comprise executable instructions that, when executed by a processor, facilitate performance of operations. The operations can comprise determining first information indicative of data storage associated with an application configured to execute on a node at which a virtual agent is installed, wherein the virtual agent comprises publicly available open source software; and transmitting the first information to a network device to facilitate forecasting of storage needs for the application.

In another example embodiment, an apparatus is provided. The apparatus can comprise: a processor; and a memory that stores executable instructions that, when executed by the processor, facilitate performance of operations. The operations can comprise determining first information indicative of data storage associated with a node at which the apparatus is located, wherein the apparatus is configured to be instantiated at the node responsive to an instantiation request and comprises non-proprietary, publicly available open source software. The operations can also comprise outputting the first information for usage in reporting capacity growth on the node.

One or more of the example embodiments described herein can provide per platform budgeting for capacity growth, which can be increasingly important for storage on-demand in the cloud. One or more embodiments can also correlate storage utilization to other platform metrics, facilitate improved planning for future growth of application and data-center expansion, facilitate more rapid identification of incipient storage issues (helps to reduce potential outage due to capacity exhaustion). One or more embodiments can also provide for dynamic deployment of agents on different node types with any configuration, thus the deployment can be automatically spun-up without custom scripting by the platform engineers and services will not have to redevelop the virtual agent for each new instantiation for virtual network functions or hardware-based compute nodes. One or more embodiments can be employed in a hosted cloud device for hosted or managed applications. One or more embodiments is broadly defined and can provide benefits to almost any application in any environment.

Turning now to the drawings, FIG. 1 illustrates an example block diagram of a system facilitating network based storage reporting in accordance with one or more embodiments described herein. The system 100 can include virtual agents and operations, collections and storage devices and operations and/or reporting devices operations in various embodiments. As shown in FIG. 1, system 100 can include one or more nodes (e.g., virtual nodes 102, 104, physical compute node 106) having virtual agents (e.g., virtual agents 108, 110, 112) installed on the one or more nodes and a network storage reporting device 114. In various embodiments, virtual node 102 can include virtual agent 108, virtual node 104 can include virtual agent 110 and physical compute node 106 can include virtual agent 112.

In various embodiments, the virtual agents 108, 110, 112 can be instantiated on one or more different nodes and can advantageously monitor storage and/or data usage of the one or more nodes. In some embodiments, the virtual agent 108 and/or virtual agent 110 can be developed employing open source tools, rendering the virtual agents 108, 110, 112 operating system and/or application independent. Accordingly, a per platform virtual agent 108, 110, 112 can be employed in any number of different operating systems. As used herein, a "platform" can be or include an operating system, application device, node or the like.

In some embodiments, the components of the virtual agent 108 can be subroutines and/or commands stored in a memory and (in some embodiments, run via command line syntax from a script). These subroutines can be specific defined specialized computers that can run across numerous different platforms, for instances, core processor percent utilization, memory percentage utilization, disk space reporting, input/output (I/O) buffering and queuing utilization, etc. These (and others) can be considered system level reporting values and/or statistics. In some embodiments, the virtual agent 108 can be used for reporting application level metrics and transaction level reporting.

One embodiment of implementation of the virtual agents 108, 110, 112 that can facilitate collection of information from one or more nodes and/or transfer of textual files to a network storage reporting device 114 for storage reporting can be implemented as follows for REDHAT LINUX/UNIX Operating System (OS).

```
#!/usr/bin/ksh
# ==========================================
#script details: appnodes.sh - version 1.0
# Name: appnodes.sh
#. $HOME/.profile > /dev/null
export var1=$(hostname)
export var2=$(date +"%Y%m%d")
# SYSTEM df -hk OUTPUT
# ==========================================
check_dfhk ( ) {
df -k | awk '{print $6,$1,$2,$3,$4,$5}'>
$HOME/${var1}_${var2}_dfhk.txt
}
# AdditionalFunctions ( )
# ==========================================
# Code Additional function HERE
# FTP Transfer
# ==========================================
send_ftp ( ) {
#TO WINDOWS BASED FTP SERVER
cd $HOME
export HOST='10.37.30.34'
export USER='anonymous'
export PASSWD='guest'
export FILE1='*dfhk.txt'
ftp -n << END_SCRIPT
    open $HOST
    user $USER $PASSWD
    prompt off
    cd /DCIE/inbox/
    mput $FILE1
    bye
END_SCRIPT
}
# Main Program
# ==========================================
#####CLEANUP PREVIOUS LOG FILES
rm $HOME/*dfhk.txt
####RUN SYSTEM LOGS
check_dfhk 2>/dev/null
if [ $? -ne 0 ]
```

-continued

```
    then echo 'Bad Command - check_dfhk'
fi
####RUN ADDITIONAL FUCNTIONS
#implement AdditionalFunctions( ) HERE
###TRANSFER FILES TO MITIGATION SERVER
# ==========================================
send_ftp
exit 0
```

In some embodiments, one or more similar processes can be written for Windows and IOS OS machines as well.

Accordingly, in various embodiments, the virtual agents 108, 110, 112 can obtain, determine and/or process data from the respective virtual nodes 102, 104 or physical compute node 106. With regard to the data obtained, determined and/or processed, the virtual agents 108, 110, 112 can transmit to (or make accessible to) the network storage reporting device (NSRD) 114. In some embodiments, one or more of the virtual agents 108, 110, 112 can be a dynamically instantiated virtual agent configured to retrieve and/or process platform level data. The platform level data can be relevant to storage stored on both storage area networks and locally. In various embodiments, one or more of the virtual agents 108, 110, 112 can be installed at, managed (e.g., modified, parameters, settings and/or configurations or values of the same modified) and/or removed from one or more of virtual nodes 102, 104 or physical compute node 106 from time to time. While the system 100 shown includes two virtual nodes 102, 104 and one physical compute node 106 along with three virtual agents 108, 110, 112, 112 and one NSRD 114, in other embodiments, any number of one or more of these components can be in system 100. For example, in some embodiments, multiple virtual agents can be included in a virtual node or a physical compute node.

In some embodiments, the NSRD 114 can gather the data from one or more of virtual agents 108, 110, 112. The NSRD 114 can determine one or more correlations between datasets. In some embodiments, the NSRD 114 can generate and/or output a report at various levels of granularity including, but not limited to, array level, and server device level. Various detail can be generated and/or reported by the NSRD 114 including, but not limited to, This detail and/or granularity can be received by one or more devices to perform further statistical analysis or decision making processes for allocation of storage to meet one or more predicted future or current needs in storage. In some embodiments, the data gathered from the one or more virtual agents 108, 110, 112 can be stored in a big data lake or data warehouse.

Figure 2:
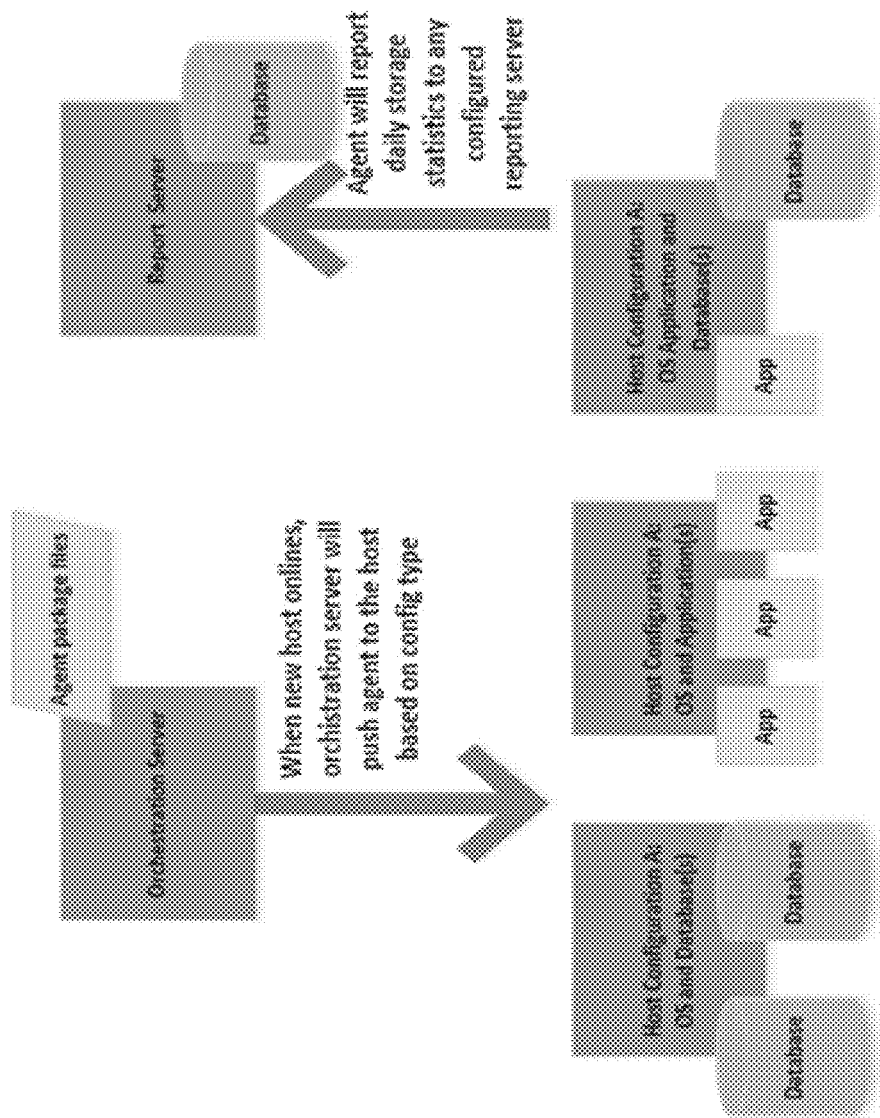
FIG. 2 illustrates an example flow diagram of a method for installation of a virtual agent and for storage reporting in accordance with one or more embodiments described herein.
Figure 3:
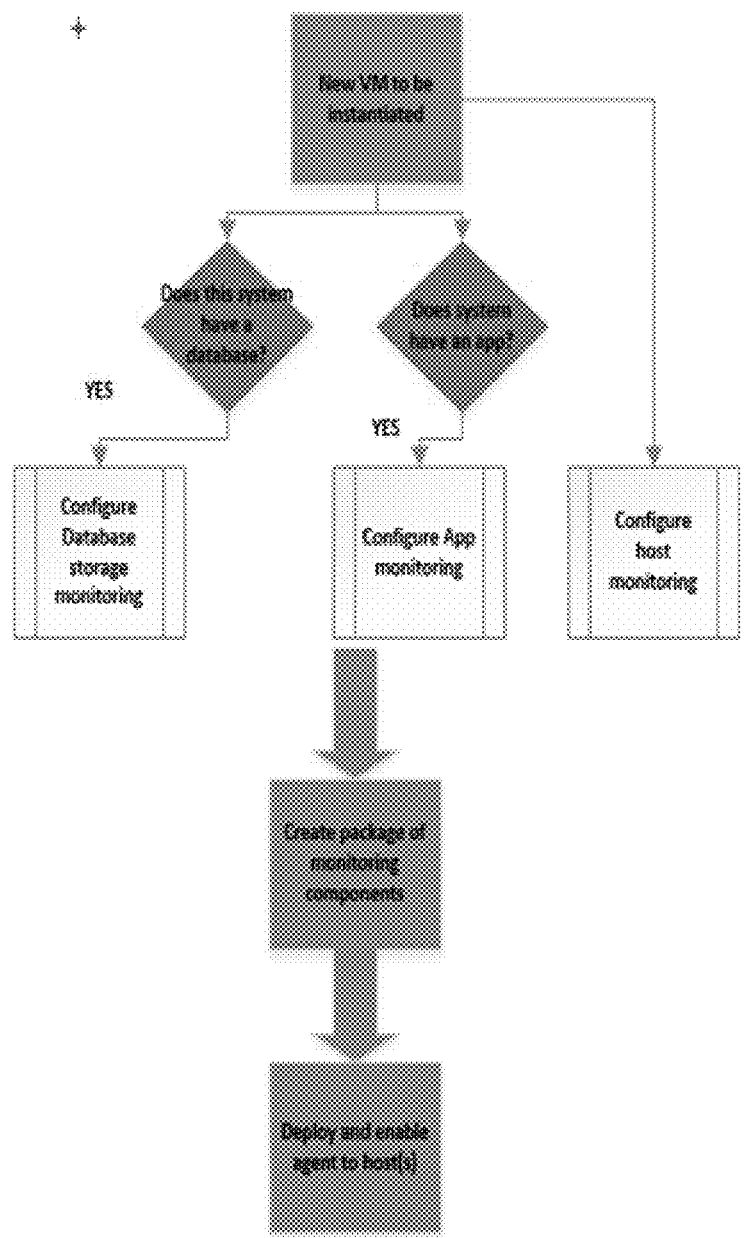
FIG. 3 illustrates a flow diagram of a method for template creation for a virtual network function (VNF) monitoring in accordance with one or more embodiments described herein.

Turning to FIG. 2, illustrated is an example block diagram of a storage reporting architecture in accordance with one or more embodiments described herein. FIG. 3 illustrates a flow diagram of a method for template creation for a virtual network function (VNF) monitoring in accordance with one or more embodiments described herein. Repetitive description of like elements employed in other embodiments described herein is omitted for sake of brevity.

With reference to FIGS. 2 and 3, the method for setting up the virtual agent 108, 110, 112 for a virtual host use case can include an automated push approach facilitated by a cloud orchestration server. As shown in FIG. 2, a virtual network function (VNF) template can be established. In some embodiments, the VNF can be or include one or more of nodes 102, 104, 106. In some embodiments, a VNF is or comprises a virtualized task and, in some embodiments, the VNF can provide one or more network functions that run on one or more virtual machines (VMs) on top of the hardware networking infrastructure—routers, switches, etc.

In some embodiments, a template for the virtual agent 108, 110, 112 can be setup to monitor a node (e.g., node 102, 104, 106) in view of one or more of the following considerations relative to a new VNF to be installed: whether the new VNF has a database, whether the new VNF has an application, one or more important directories or directories of interest for the new VNF and/or virtual agent 108, 110, 112 to monitor, other configuration information for the new VNF and/or virtual agent 108, 110, 112, and/or when to schedule monitoring (e.g., day, time, event-based monitoring) of the new VNF. In some embodiments, this template setup can include, but is not limited to, specific VNF info (such as host, database name, and reporting server to connect). In some embodiments, this will also include use cases for removing the monitoring when a VNF is removed or deactivated.

After setting up the template, the template for the virtual agent 108, 110, 112 can be saved in the orchestration server. Template creation for the virtual agent (e.g., virtual agent 108, 110, 112) monitoring the VNF can be as shown in FIG. 3. As shown, if the system has a database or an application, the virtual agent 108, 110, 112 can be designed with a template for monitoring the VNF database or application. A plurality or package of one or more virtual agent monitoring components can be generated. After generation of such, the virtual agent 108, 110, 112 can be deployed and instantiated on the node.

After the template for the virtual agent 108, 110, 112 is saved in the orchestration server, the virtual agent 108, 110, 112 can be installed on a new VNF that will be deployed. The virtual agent 108, 110, 112 can be installed on the new VNF via an orchestration server for example in some embodiments. In some embodiments, specific VNF information (e.g., host, database name and/or reporting server device to connect) can be included. In some embodiments, the information for configuration of the virtual agent 108, 110, 112 can also include use cases for removing the monitoring when a VNF is removed or deactivated.

A manual setup for the virtual agent 108, 110, 112 can be as follows. The user can manually copy files to physical host or virtual machine (VM). The user can configure monitoring for their host. The user can manually configure when to report on the OS scheduling tool in their OS. The user can configure use cases for removing the monitoring when a host or VM is removed or deactivated.

As shown in FIG. 2, the virtual agent 108, 110, 112 can report storage information (e.g., statistics) to any configured reporting server (e.g., network storage reporting device 114). In various embodiments, the storage reporting can be provided periodically (e.g., daily, weekly) and/or based on one or more events or conditions being determined to have occurred. Events or conditions can be past or historic storage patterns, network outages due to storage issues, predicted storage-related conditions relative to the type of the application, operating system, node or the like.

In various embodiments, the virtual agents 108, 110, 112 can monitor any brand of database, storage, operating system and/or hardware. The virtual agents 108, 110, 112 can monitor storage within applications and databases, on nodes (e.g., both virtual and hardware based nodes), and in datacenters and/or whole clouds. In some embodiments, the virtual agents 108, 110, 112 can be created and/or destructed dynamically. The virtual agents 108, 110, 112 can be stored and/or deployed by any automation server (e.g., AT&T eComp, OpenStack orchestrators, Vmware).

In some embodiments, the virtual agent 108 and/or 110 can be or include one or more coded algorithms that operate to produce a result-set or output of data. In this case, system level storage data about a node can be acquired from a network storage reporting device 114 or an interface or computer or mobile device (not shown) that can display information stored at the or accessed by the network storage reporting device 114. In some embodiments, the system level storage data about a node can be acquired through the use of interface commands, the output can be recorded in textual files by the virtual agents 108, 110, 112 and/or can then transmitted (as textual files or otherwise) to the network storage reporting device 114 where the textual files can be stored and/or made available for general reporting use by or to an end user device.

In some embodiments, the nodes 102, 104, 106 can be hardware based and/or software based. For example, in some embodiments in which the nodes are hardware-based, the nodes can be standalone server devices. The one or more virtual agents 108, 110, 112 can be dynamically deployable and/or can gather dataset for the storage reporting.

The virtual node will never know that it is a virtual node. So, in essence, there is no difference in the way the agent interacts with the VNF versus the physical node. Both the VNF and the PNF (Physical Node Function) operate on similar OS platforms and both can have similar or identical abilities. A scheduler device or functionality (e.g., cronjob) can initiate and/or run the virtual agent script, which can record the data and/or then initiate or allows the data to be collected.

FIG. 2 illustrates an example block diagram of a storage reporting architecture in accordance with one or more embodiments described herein. As shown, the agent can package files. When or after the new host (e.g., node) comes online, the orchestration server can push the agent to the host (e.g., node) based on the type of template or configuration designed for monitoring the node. The host configuration A (which can be a database such as databases 203, 205, 215 or one of applications 207, 209, 211, 213 in some embodiments) can receive the virtual agent 108 and/or virtual agent 110 can be an OS and/or a database. In some embodiments, the virtual agent 108 and/or virtual agent 110 can report one or more aspects of storage (e.g., daily storage statistics) to any configured reporting server or device (e.g., network storage reporting device 114).

In some embodiments, there are three main components to system 100: virtual agent 108, collection and storage component and/or network storage reporting device 114. Those and the associated generic functions are defined in the following three respective sections In various embodiments, the virtual agent 108 can be defined as follows. In some embodiments, the virtual agent nodes 108, 110, 112 can acquire or develop the agent code on each node. This agent code can be coded individually on each node for the case of physical hardware and/or can be generic code as part of the VNF image. In some embodiments, the agent code can implement a main block, which calls various sub-function blocks (see example script provided herein). The agent code can test for block execution and valid results. The agent code can record the result-set into an output textual-file for other distributable format. The agent code can transfer the result-set to the collection storage server.

The collection and storage component can be defined as follows (with collection being performed by the virtual agent 108 and the reporting being performed by the network storage reporting device 114). In some embodiments, storage and command function capabilities can be implemented at a node 102 to allow for collection of storage information by the virtual agent 108. For example, a storage server (not shown) of the node 102 can provide a repository of SAN, disk space or other storage allocation area. The storage server can provide discrete access level permissions using least privileged methods (read-only, limited access, etc. . . . ). In some embodiments, storage server will allow for a parsing process (i.e. EXE or JAR executable file) that reads and organizes the transferred files (or textual files to be transferred by the virtual agent 108). In some embodiments, storage server then processes and loads the organized data into a database management system.

In some embodiments, to implement a database reporting server/service at the node 102, one or more of the following can be provided. A Database Management System (DBMS) can be any number or type of DBMS (e.g., MySQL, SQL Server, Oracle). The database can be a file-system based database structure in some embodiments. In some embodiments, the database can be an in-memory database structure. The administrator (DBA) Administrator (DBA) of the DBMS allows least privileged access to the data for developers and users. In some embodiments, the loaded data at the node 102 can be reduced to categorize and aggregate to appropriate levels for use by engineering team and capacity managers (end users) via the network storage reporting device 114.

In some embodiments, graphical and tabular output can also be generated by the network storage reporting device 114 (or a device having a graphical user interface and electrically and/or communicatively coupled to the network storage reporting device 114). In some embodiments, graphical and tabular output can also be generated for visualization of the data. In some embodiments, based on the ability of the DBMS, the network storage reporting device 114 and/or the end user ability, there can be end user generated reporting. In some embodiments, the format of the visualization by the network storage reporting device 114 can be set to allow end users the ability to do detailed data analysis for big data intelligence modeling.

FIGS. 4A, 4B and 4C illustrate screenshots of data collection, processing and reporting in accordance with one or more embodiments described herein. The screenshots illustrate ways data and reporting can be handled and include, but are not limited to, command-line operations and simple network management protocol (SNMP) polling. As shown in FIG. 3A (SAR-U (Processor)) and FIG. 3B (SAR-R (Memory)) can be generated for processor and memory data statistics. In some embodiments, the SAR-U command can cause CPU statistics to be generated. In some embodiments, the SAR-R command can cause information indicative of an amount of memory (e.g., number of memory pages and swap-file disk blocks) that is currently unused. In some embodiments, the SNMP (system up time) and/or optional downtime checks can also be performed.

The outputs in FIG. 4C can be stored into files and/or transferred to the collection agents for further analysis, trending and/or reporting. Typical reports, those which are the most relevant for a certain node-type or platform application, can be specific to the node and the application function in the network. As previously explained, the system reports can be those related to CPU, memory, disk space, etc. while the application can be used for bandwidth or traffic monitoring, and/or for billing and querying in databases. As such, there can be an element of discovery that can occur based on the specific formulae or counters that the platform application generates for its network functions.

In some embodiments, there can be specific reporting performed as to allow for a application to be queried and data stored specifically for that application needs. That might be a specific command or a specific SNMP query in various embodiments, which can be implemented based on the application build by the application vendor.

The NSRD 114 can parse and/or present or report the data in various ways to different entities and/or devices with different reporting needs. In some embodiments, one or more of the virtual agents can deliver data on a user-defined periodic basis or based on one or more conditions to a central big data repository where data is processed, categorized and/or analyzed for reporting needs. The NSRD 114 can be a front-end tool that can provide delivery of the data to the end users in graphical reporting form. In various embodiments, by way of example, but not limitation, the NSRD 114 can generate and/or provide one or more of monthly summary reports distributed electronically to devices for one or more entities (e.g., company devices, devices associated with company executives); periodic (e.g., weekly, daily, monthly) reporting delivered to managers for interim system health checks and/or on-demand reporting via graphical user interface (GUI) and web-based tools.

One or more embodiments described herein can be easily adapted to be used with other datasets and/or other reporting tools in many settings in which storage resources are evaluated and/or allocated.

Figure 5:
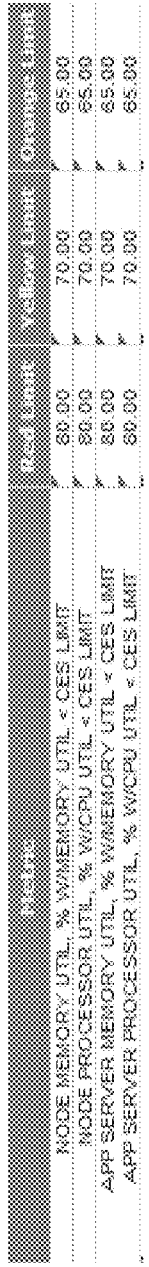
FIG. 5 illustrates an example table detailing information obtained by one or more virtual agents to facilitate network based storage reporting in accordance with one or more embodiments described herein.
Figure 6:
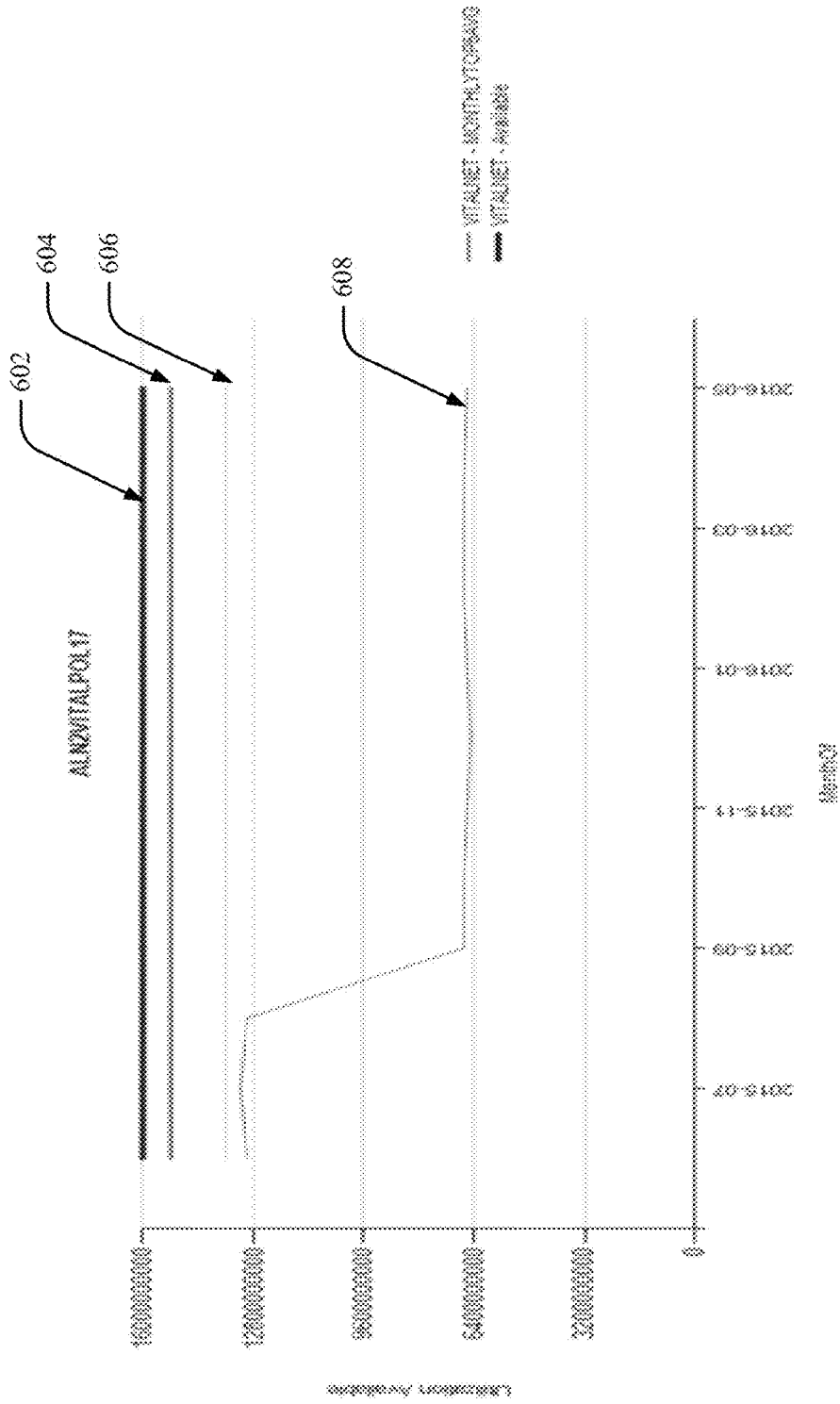
FIG. 6 is an example graph that illustrates data monitoring for network based storage reporting in accordance with one or more embodiments described herein.
Figure 7:
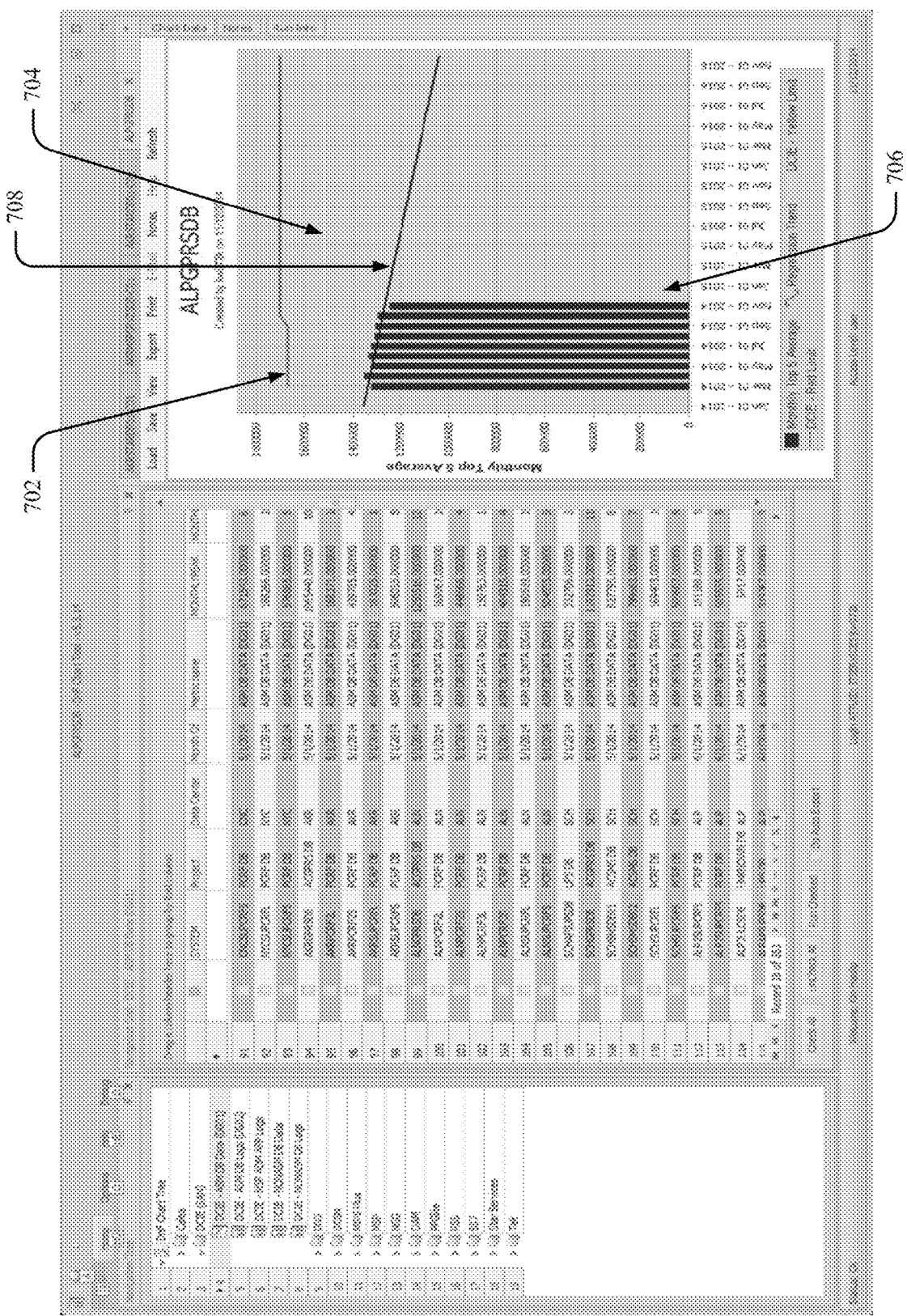
FIG. 7 is an example graph that illustrates data monitoring for network based storage reporting in accordance with one or more embodiments described herein.

FIG. 5 illustrates an example table detailing information obtained by one or more virtual agents to facilitate network based storage reporting in accordance with one or more embodiments described herein. FIG. 6 is an example graph that illustrates data monitoring for network based storage reporting in accordance with one or more embodiments described herein. FIG. 7 is an example graph that illustrates data monitoring for network based storage reporting in accordance with one or more embodiments described herein.

With reference to FIGS. 5, 6 and 7, in some embodiments, storage can be provided on a per platform basis. In various embodiments, the storage reports can be as shown in FIGS. 5, 6 and/or 7. A storage report can be generated by the NSRD 114. In some embodiments, a storage report can include information about or indicating an amount of storage used and/or allocated in one or more nodes (e.g., virtual nodes 102, 104; physical node 106) and/or data centers on a per platform basis. In various embodiments, the NSRD 114 can generate and/or output one of two different types of storage reports: an all platform report (e.g., a red, yellow, green and orange (RYGO) report) and/or an individual report (e.g., a report for a single platform, or a per platform report). In some embodiments, the report can be generated based on initiation of a crontab software or computer program on a system that runs a script and/or outputs a file. An RYGO report can be a historical trending report of actual values and/or aggregated values at various levels of the platform server and application hierarchy that relates performance information to the Engineering, Operations and Support teams network health and/or capacity growth needs. RYGO can be a subset of the overall network health reporting and relates directly to the Demand and Forecasting (DnF) charts for Capacity Management and Capital Expenditures.

The file can be stored in the data warehouse and the NSRD 114 can employ reporting capability to generate one or more reports using the data from the scripts. In some embodiments, a RYGO report can be an electronic report and can be available online or via email. The NSRD 114 can generate one or more RYGO reports that show nodes that either are near or above capacity or had a large change in usage at a defined point in time within a recent past amount of time or the like. In some embodiments, the NSRD 114 can provide one or more reports via or on the internet or email. In some embodiments, the NSRD 114 can provide reports on nodes with suspected storage limitations or issues and/or can show storage information for all nodes. The reports can be on a per platform basis. In some embodiments, the reports can be displayed on a DnF GUI display. In some embodiments, the NSRD 114 can show a chart of storage use over time for different systems and/or volumes.

FIG. 5 is a table that illustrates CES guideline values assigned by various organizations (e.g., LABS, Vendors, FNP and Engineering, typically) that are used in the grading or gauging of the metrics for charting and/or trending purposes. FIG. 5 is an example for two types of platforms (e.g., nodes and application servers) with two metrics each (e.g., CPU and memory) with their associated limits for charting purposes. One or more embodiments of the system described herein (or components of the system described herein) can be implemented on dissimilar node types but have very similar metric reporting output.

Without baseline values such as these, a metric value may be meaningless and provide no real value (or limited value) to the entity or user interpreting or acting on the metric. For instance, a doctor tells a patient that his temperature is 102.2 degrees. Without the knowledge that 98.6 is normal, the value of 102.2 does not detail the level of significance that the patient should give to the 102.2 degree value. While the patient may believe he may be feeling slight discomfort, he may not realize that he is in fact very ill. In one or more embodiments, utilization on the nodes One or more embodiments of evaluating and/or determining utilization on the nodes can have similar functionality. For example, a 7-day average value (e.g., utilization) of a particular numerical value in isolation may not reveal very much information. However, based on the performance in the red limit (relative to the yellow limit or orange limit), the node may be nearing exhaustion of processing and memory resources, the node might already be dropping calls, or having high user latency (which a paying customer is likely to notice). In other words, the node may have a fever of 102.2 degrees, but without the thermometer (Green, Red and Yellow values) the user might not know that the node is nearing a complete shutdown.

FIG. 6 shows the DCIE data being used, which was previously provided by the virtual agent and the collector/parser by use of an Off-the-Shelf tool from Microsoft (Reporting Services) which is delivered as part of the SQL Server 2008 (or version 2012 and later) application suite in accordance with one or more embodiments described herein. As is typical with the development of a DNF (Demand and Forecast) chart, the Black line 602, Red line 604 and Yellow line 606 can present and/or display information that can provide a gauge to measure the current month-over-month utilization. The yellow line 606 can be the warning level, the red line 604 can be the alert level and the black line 602 can be the absolute utilization ceiling. In this case, the blue line 608 can represent the month-over-month utilization (Top5MonthlyAvg) to be used for trending. As shown, the blue line 608 shows a significant reduction in utilization around August of 2015. This was the result of the system described herein (and/or users utilizing the system described herein) implementing load balancing or traffic migration that can be performed utilizing the information generated and/or extracted by the virtual agents to alleviate the high-utilization which was shown nearing the yellow limit/line 606 in the previous months.

FIG. 7 shows the use of the same dataset (DCIE dataset) of FIG. 6 though not the same node) being used which was previously provided by the virtual agent and the collector/parser by use of a home-grown tool (DNF Tool). In some embodiments, FIG. 7 shows that the data collected and stored by the virtual agent and collectors can be used in a generic fashion by any team and for various data sources and nodes. Users are able to use third party tools and custom developed tools alike to gauge the data output and make decisions about growth and capital expenditure need within their budgeted allowances. The data may show (as in FIG. 5) that rebalance or a traffic change can reduce the utilization to be within acceptable limits or (as in FIG. 6) it can show a trending decrease in traffic and forecast a time when the node can be decommissioned or repurposed. Both of these outputs can help a company or entity save on expenses by allowing entities or users to make decisions that save funding needs. For this figure there are red limits 702 and yellow limits 704 and trending values (e.g., blue bar chart 706) as well as a forecasted black linear regression line 708 to show expected values up to 18 months into the future.

Figure 8:
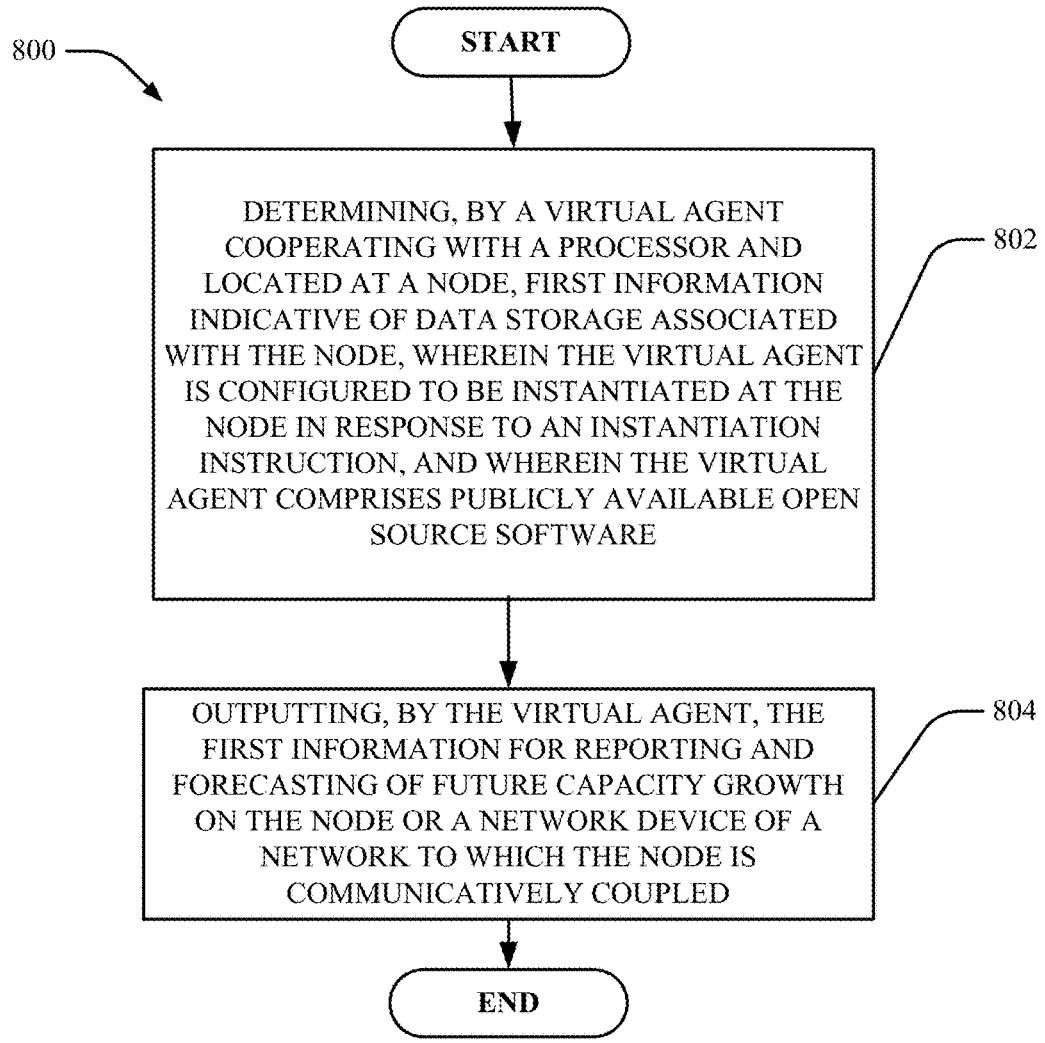
FIGS. 8, 9 and 10 are example flowcharts of methods of operation of virtual agents to facilitate network based storage reporting in accordance with one or more embodiments described herein.
Figure 9:
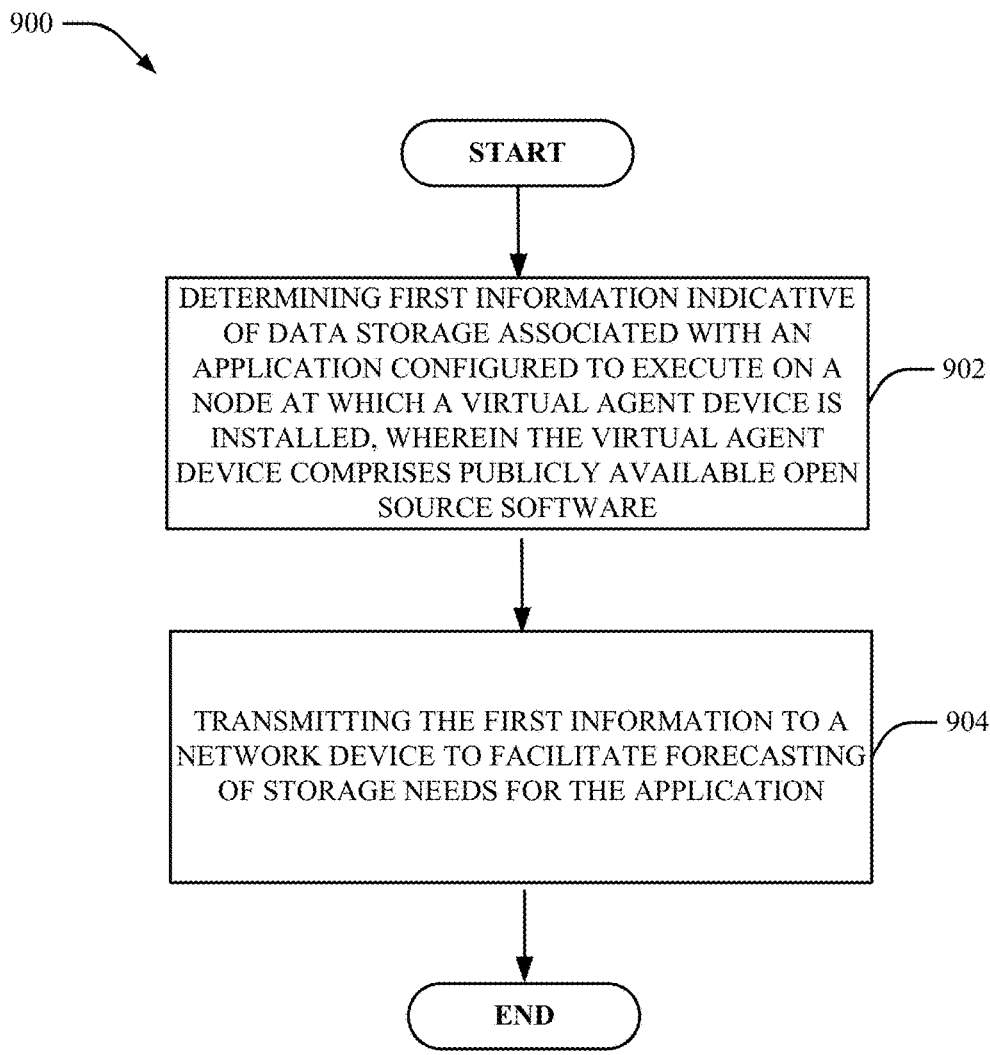
Figure 10:
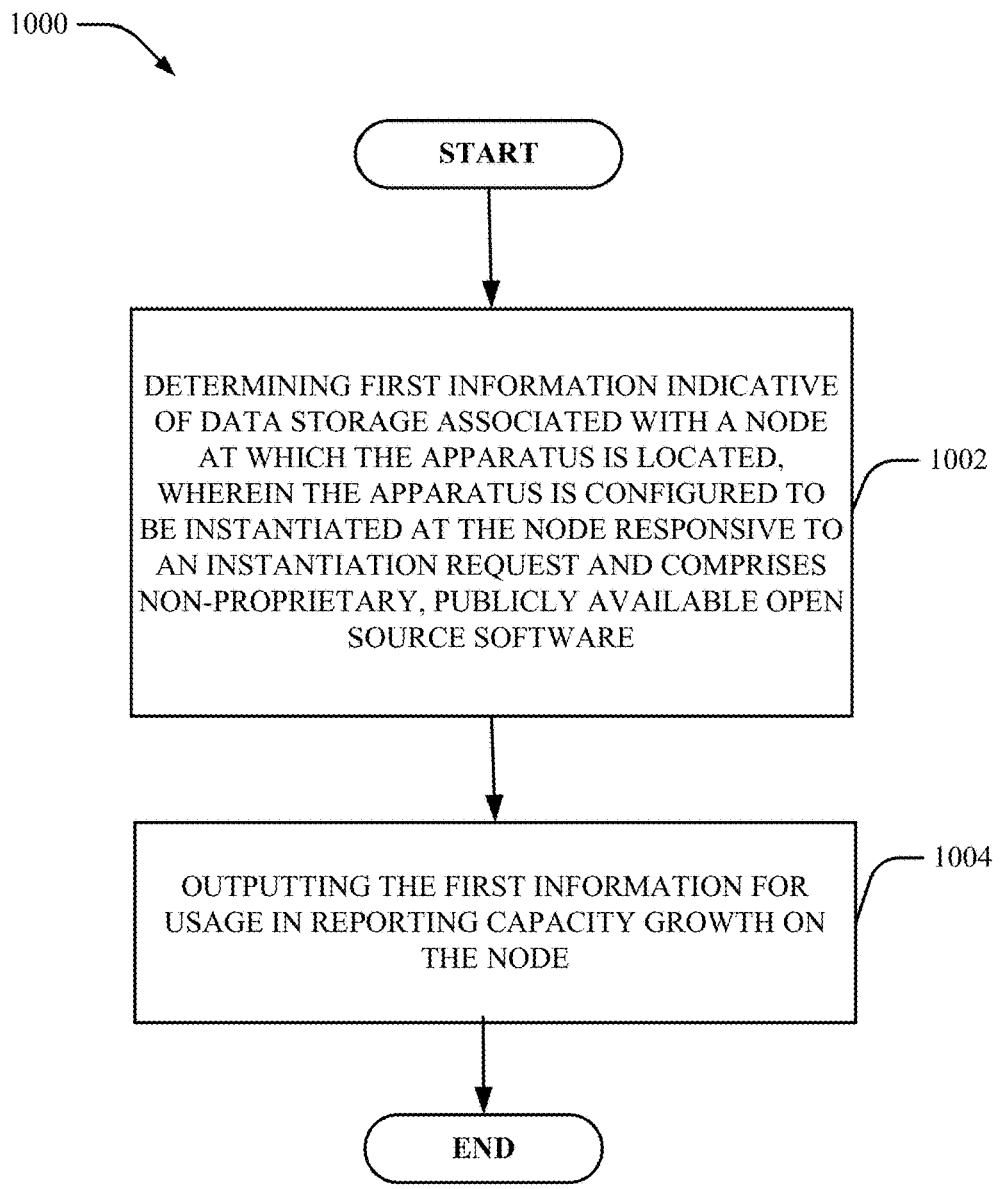

FIGS. 8, 9 and 10 are example flowcharts of methods of operation of virtual agent to facilitate network based storage reporting in accordance with one or more embodiments described herein. In some embodiments, the virtual agents can be or include one or more of the structure and/or functionality of virtual agents 108, 110, 112. Repetitive description of like elements employed in other embodiments described herein is omitted for sake of brevity.

Turning first to FIG. 8, at 802, method 800 can include determining, by a virtual agent cooperating with a processor and located at a node, first information indicative of data storage associated with the node, wherein the virtual agent is configured to be instantiated at the node in response to an instantiation instruction, and wherein the virtual agent comprises publicly available open source software. In some embodiments, because the virtual agent is configured to be deployed on a plurality of different nodes, applications and databases associated with a respective plurality of manufacturers based on the virtual agent including the publicly available open source software.

In some embodiments, the virtual agent is further configured to determine second information indicative of data storage associated with a storage area network to which the node is communicatively coupled. In some embodiments, the virtual agent is further configured to determine third information indicative of data storage associated with a network application.

The node can take any number of forms including, but not limited to, virtual nodes, hardware-based nodes or the like. For example, a hardware-based node can be a hardware-based standalone server device in some embodiments.

At 804, method 800 can include outputting, by the virtual agent, the first information for reporting and forecasting of future capacity growth on the node or a network device of a network to which the node is communicatively coupled. For example, the outputting can be to the NSRD 114 in some embodiments.

Turning now to FIG. 9, at 902, method 900 can include determining first information indicative of data storage associated with an application configured to execute on a node at which a virtual agent is installed, wherein the virtual agent comprises publicly available open source software. At 904, method 900 can include transmitting the first information to a network device to facilitate forecasting of storage needs for the application. In some embodiments, the transmitting is performed on a defined periodic basis and is based on a type of report requested to be generated by the network device.

Turning now to FIG. 10, at 1002, method 1000 can include determining first information indicative of data storage associated with a node at which the apparatus is located, wherein the apparatus is configured to be instantiated at the node responsive to an instantiation request and comprises non-proprietary, publicly available open source software. At 1004, method 1000 can include outputting the first information for usage in reporting capacity growth on the node.

Figure 11:
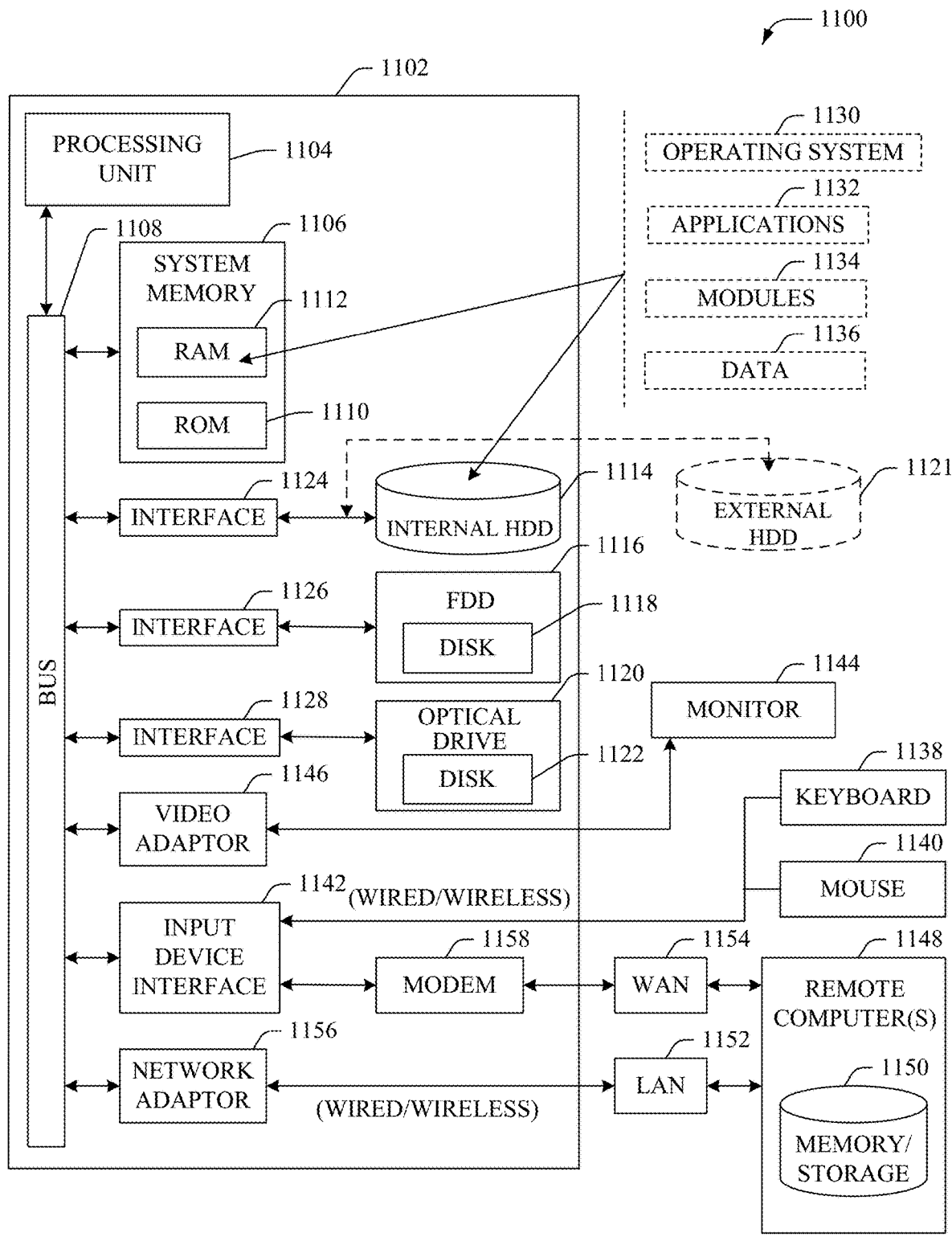
FIG. 11 illustrates a block diagram of a computer operable to perform the methods of the virtual agent or to facilitate network based storage reporting in accordance with one or more embodiments described herein.

FIG. 11 illustrates a block diagram of a computer operable to perform the methods of the virtual agent or to facilitate network based storage reporting in accordance with one or more embodiments described herein. In one or more embodiments, the computer can be or include one or more of virtual agents devices 108, 110, 112 and/or NSRD 114, virtual nodes 102, 104 and/or physical compute node 106 (or components of the one or more of virtual agents devices 108, 110, 112 and/or NSRD 114, virtual nodes 102, 104 and/or physical compute node 106). In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for implementing various embodiments of the embodiments described herein comprises a computer 1102, the computer 1102 comprising a processing unit 1104, a system memory 1106 and a system bus 1108. The system bus 1108 couples system components comprising, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1113 (e.g., EIDE, SATA), which internal hard disk drive 1113 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A mobile device can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS device)," "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "movable object," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above res mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a virtual agent cooperating with a processor and located at a node, first information indicative of first data storage associated with the node, wherein the virtual agent is configured to be instantiated at the node in response to an instantiation instruction, wherein the virtual agent comprises publicly available open source software, and wherein the first data storage associated with the node is acquired via user interface commands;
   facilitating, by the virtual agent, forecasting of future capacity growth on the node or a network device of a network to which the node is communicatively coupled;
   facilitating, by the virtual agent, deployment of different nodes other than the node on which the virtual agent is instantiated, to provide second data storage based on the forecasting, wherein the facilitating the deployment is based on the virtual agent transferring, to a network storage reporting device, the first information;
   recording, by the virtual agent, in a textual file, an output of the first data storage associated with the node, wherein the output is recorded based on determination that a defined event has occurred; and
   transmitting, by the virtual agent, the textual file to the network storage reporting device, wherein the virtual agent is further configured to determine second information indicative of third data storage associated with a storage area network to which the node is communicatively coupled, and wherein the event comprises a network outage due to a storage condition.

2. The method of claim 1, wherein the virtual agent is further configured to determine third information indicative of fourth data storage associated with a network application, and wherein the event comprises a predicted storage-related condition relative to a type of application associated with the virtual agent.

3. The method of claim 1, wherein the node comprises a virtual node.

4. The method of claim 1, wherein the node comprises a hardware-based standalone server device.

5. The method of claim 1, wherein the outputting is performed repeatedly.

6. A non-transitory machine-readable storage medium, comprising executable instructions that, when executed by a processor, facilitate performance of operations, comprising:
   determining first information indicative of data storage associated with an application configured to execute on a node at which a virtual agent is installed, wherein the virtual agent comprises publicly available open source software;
   facilitating forecasting of future capacity growth on the node by a network storage device, and wherein the first data storage associated with the node is acquired through user interface commands;
   facilitating deployment of different nodes other than the node on which the virtual agent is installed, to provide other data storage based on the forecasting, wherein the facilitating the deployment is based on the virtual agent transferring, to the network storage reporting device, the first information; and recording, in a textual file, an output of the first data storage associated with the node, wherein the output is recorded based on determination that a defined event has occurred, wherein the virtual agent is further configured to determine second information indicative of third data storage associated with a storage area network to which the node is communicatively coupled, and wherein the defined event comprises a network outage due to a storage condition.

7. The non-transitory machine-readable storage medium of claim 6, wherein the node comprises a virtual node.

8. The non-transitory machine-readable storage medium of claim 6, wherein the node comprises a hardware-based node.

9. The non-transitory machine-readable storage medium of claim 8, wherein the hardware-based node comprises a standalone server device.

10. The non-transitory machine-readable storage medium of claim 6, wherein the facilitating the forecasting is performed on a periodic basis.

11. The non-transitory machine-readable storage medium of claim 10, wherein the periodic basis is based on a type of report requested to be generated by the network device.

12. The non-transitory machine-readable storage medium of claim 6, wherein the virtual agent is configured to be deployed to the different nodes based on the virtual agent comprising the publicly available open source software.

13. An apparatus, comprising:
a processor; and
a memory that stores executable instructions that, when executed by the processor, facilitate performance of operations, comprising:
determining first information indicative of first data storage associated with a first node at which the apparatus is located, wherein the apparatus is configured to be instantiated at the first node responsive to an instantiation request and comprises publicly available open source software, and wherein the first data storage associated with the node is acquired through user interface commands;

facilitating forecasting of future capacity growth on the first node or a network device of a network to which the first node is communicatively coupled;

facilitating establishment of second nodes different from the first node on which the apparatus is instantiated, to enable second data storage based on the forecasting, wherein the facilitating the establishment is based on the apparatus transferring, to a network storage reporting device, the first information;

generating, for recordation to a file, an output of the first data storage associated with the node, wherein the output is generated based on determination that a defined time period has passed; and transmitting the file to the network storage reporting device, wherein the virtual agent is further configured to determine second information indicative of third data storage associated with a storage area network to which the first node is communicatively coupled, and wherein passage of the defined time period indicates a network outage due to a storage condition.

14. The apparatus of claim 13, wherein the operations further comprise determining second information indicative of third data storage that is also associated with a network application.

15. The apparatus of claim 13, wherein the first node comprises a hardware-based system.

16. The apparatus of claim 13, wherein the first node comprises a virtual system.

17. The apparatus of claim 13, wherein the first information is for further usage in the forecasting the future capacity growth on the first node.

18. The apparatus of claim 13, wherein the facilitating forecasting is performed on a periodic basis that is based on a type of report requested to be generated by the network device.

19. The method of claim 2, wherein the event comprises a predicted storage-related condition relative to a type of application associated with the virtual agent.

20. The non-transitory machine-readable storage medium of claim 12, wherein the virtual agent comprises the publicly available open source software.

* * * * *